J. MUZZY.
STUMP EXTRACTING MACHINE.
APPLICATION FILED JUNE 13, 1911.
1,051,435.
Patented Jan. 28, 1913.
3 SHEETS—SHEET 1.
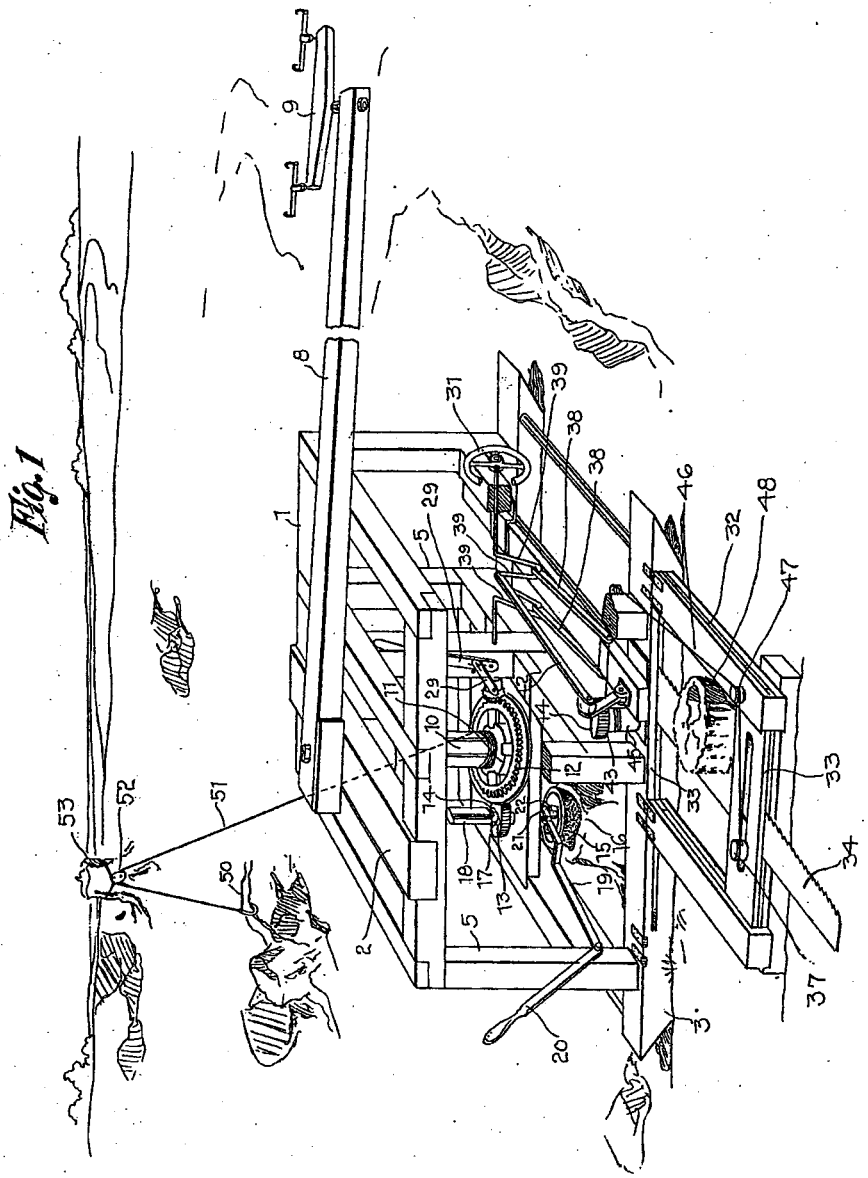
WITNESSES
Robert M. Sutphend
Irv. L. McCathran
INVENTOR
JOHN MUZZY
By E. E. Vrooman
Attorney

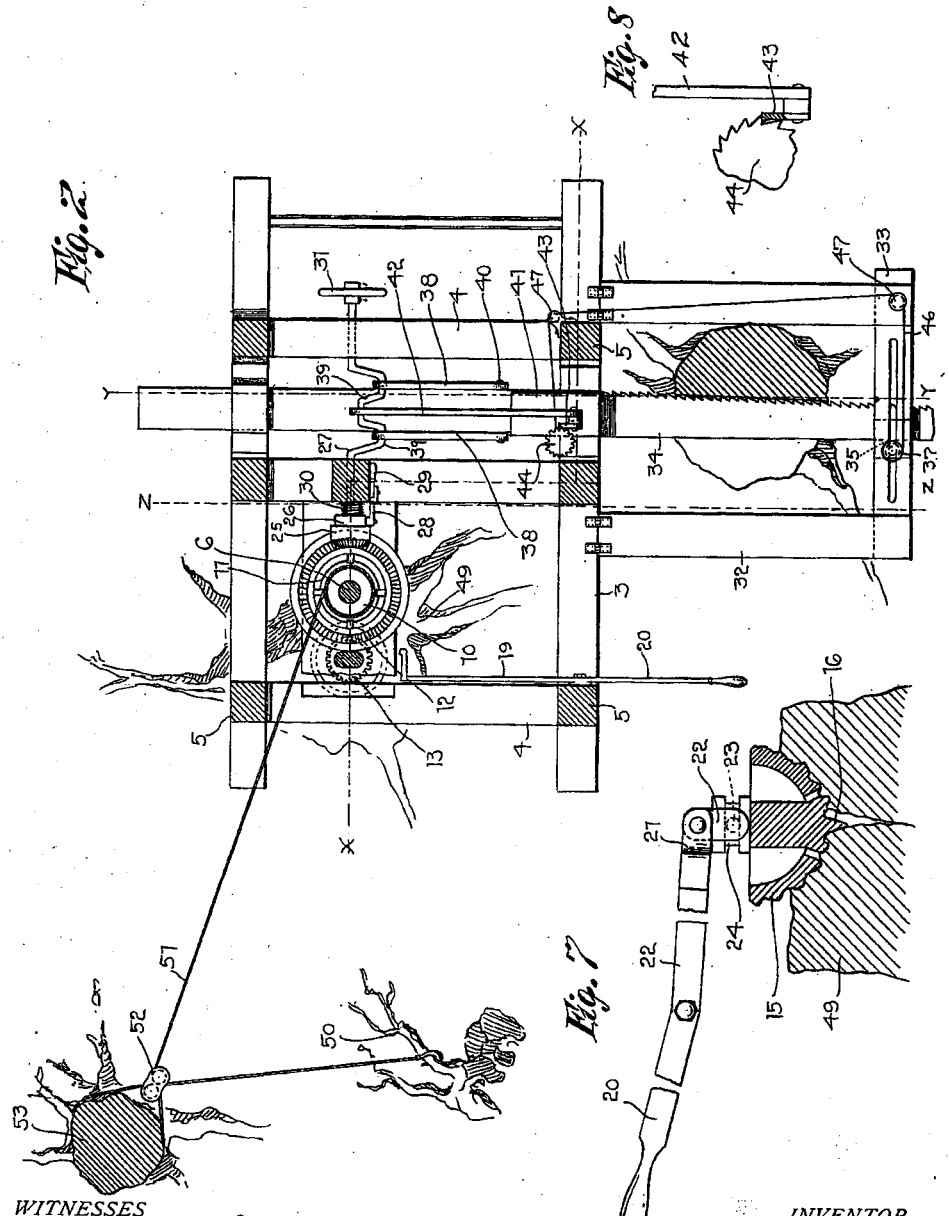

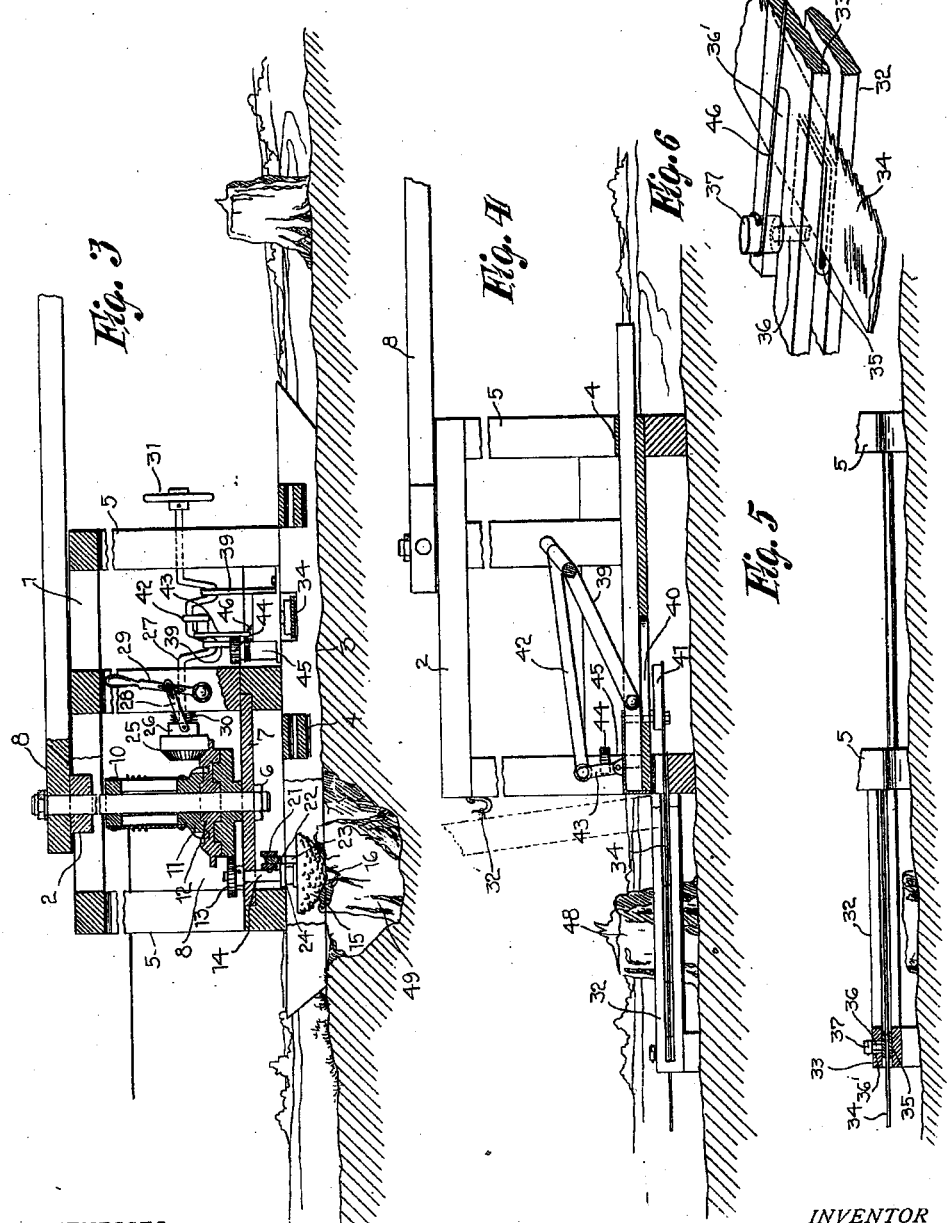

UNITED STATES PATENT OFFICE.

JOHN MUZZY, OF WARBA, MINNESOTA.

STUMP-EXTRACTING MACHINE.

1,051,435.  Specification of Letters Patent.  Patented Jan. 28, 1913.

Application filed June 13, 1911. Serial No. 632,843.

*To all whom it may concern:*

Be it known that I, JOHN MUZZY, a citizen of the United States, residing at Warba, in the county of Itasca and State of Minnesota, have invented certain new and useful Improvements in Stump-Extracting Machines, of which the following is a specification, reference being had therein to the accompanying drawing.

This invention relates to machines for removing tree stumps from the ground.

The invention has for its object to provide an apparatus by means of which a tree stump located in the ground may be sawed off close to the ground and then bored to hollow out the body of the stump and also to remove the roots of the stump by removing them from the ground.

The invention consists of an apparatus for sawing, hollowing out, and removing roots of a stump, constructed and arranged as hereinafter set forth and claimed.

Referring to the accompanying drawings:—Figure 1 is a view in perspective of a stump removing apparatus constructed in accordance with this invention, and shown in operative position. Fig. 2 is a plan view in horizontal section of the apparatus. Fig. 3 is a vertical cross section on the line X—X, Fig. 2. Fig. 4 is a longitudinal section on the line Y—Y, Fig. 2. Fig. 5 is a detail view of a portion of the framework on the line Z—Z, Fig. 2. Fig. 6 is a detail view in perspective showing a portion of a saw and its position when mounted in the framework. Fig. 7 is a sectional view of the boring tool, and Fig. 8 is a plan view, partly in section, of the lever and toothed wheel.

In carrying out the invention a suitable framework is provided and, as here shown, consisting of an upright rectangular structure formed with the top rectangular frame 1 having cross bars 2 and the lower rectangular frame 3 having cross bars 4, the top frame 1 and the bottom frame 3 being connected together by uprights or posts 5. The side bars of the lower frame 3 serve as runners to enable the structure to be hauled from one spot to another. Located in the framework is a vertical shaft 6 having its bearings in one of the top cross bars 2, and in the cross bar 7 located adjacent to the bottom of the framework. The shaft 6 is rotated by means of an arm 8 projecting from the side of the top frame 1 having at its outer end a whiffletree 9 to which a team operating the machine is attached. Mounted on the shaft 6 is a drum 10 having its base portion 11 secured to a toothed wheel 12 fastened to the shaft 6 and meshing with a toothed wheel 13 resting on the cross bar 7 and mounted on a shaft 14 having on its lower end a suitable boring tool, preferably, as here shown, of a hemispherical shape, the body 15 having a roughened surface and a centrally depending pointed projection 16. The shaft 14 projects through an oblong opening 17 in the toothed wheel 13 and has at its upper end an oblong enlargement 18 adapted, when drawn down, to fit into the oblong opening 17 in the wheel 13, thereby locking the shaft 14 to the wheel 13. This is effected by means of a lever arm 19 pivoted at one end to one of the uprights 5 of the framework and adapted to be swung vertically by means of a lever 20. The other end of the lever arm 19 is formed with a fork 21 in which is pivoted a short arm 22 having lateral projecting pins 23 located in a groove 24 on the shaft 14.

By operating the lever handle 20 the boring tool may be raised and lowered and the shaft 14 moved into and out of engagement with the toothed wheel 13. Meshing with the toothed wheel 12 is a bevel gear wheel 25 having a collar 26 splined to the double crank shaft 27 so as to be slidable thereon and movable into and out of engagement with the toothed wheel 12 which is effected by means of a link 28 pivoted at one end to the collar 26 and at its other end to a lever handle 29 hinged to the framework of the apparatus. The beveled gear wheel 25 is normally held in engagement with the toothed wheel 12 by means of a coil spring 30 held under tension between the collar 26 of the wheel 25 and one of the uprights 5 of the framework. The hand wheel 31 is mounted on the outer end of the beveled crank shaft 27 so that the shaft 6 may be manually operated through the wheel 25 and double crank shaft 27, if desired, instead of by the arm 8 and a team hitched thereto. Hinged to one side of the framework is a rectangular frame 32 adapted when in use to lie flat upon the ground, as shown in Fig. 1, and when not in use to be folded up against the side of the framework, as shown in dotted lines in Fig. 4 and held in such position by means of hooks 32'. Located at each end of the frame 32 is a transverse strip 33 spaced above the end of the frame 32 so as to permit a saw 34 to be located in the spaces formed by said strips and the frame and to be held in a clip 35 adapted to be moved longitudinally between the strip 33 and the frame 32 and provided at its rear end with a pin 36 on which is a head 37. The pin 36 is movable through a slot 36' in the strip 33. The saw is reciprocated by means of a pair of rods 38 pivotally connected at one end to the cranks 39 of the crank shaft 27 and pivotally connected at the other end to pins 40 on the handle 41 of the saw.

In order that the saw may be held against a stump and be advanced as it cuts the stump, a device is provided consisting of a rod 42 pivotally connected at one end to a crank 39 of the crank shaft 27 and at the other end to one end of a short lever arm 43 which is adapted to swing back and forth adjacent to a toothed wheel 44, the teeth of which project so that in one direction of movement of the arm 43 it will slide over said teeth and in its opposite movement will engage a tooth and turn said wheel and with it a drum 45 on which said wheel is mounted and which is pivoted to the framework. Wound upon the drum 45 is a cord 46 which passes over pulleys 47 on the frame 32 and is connected at its other end to the head 37 of the pin 35.

It will be seen that by means of this device the saw will be held against a stump 48 and drawn into the same as the cutting advances. The stump 48 is sawed off close to the ground and the apparatus is then shifted so as to bring the boring tool over the stump which is then hollowed out by said tool. After the stump has been hollowed out all or part of the roots may be removed by means of the rope 51.

As shown in Figs. 2 and 7 another stump 49 is being bored out and the roots 50 of a stump are being removed by means of a rope 51 passing over a pulley 52 secured to a stump or other suitable support 53, the rope 51 being wound around the drum 10 and wound up thereon by the rotation of the shaft 6.

It will be seen that by means of the apparatus hereinafter described that three operations are performed, namely, a stump is prepared for boring and hollowing out by being sawed off close to the ground, and the stump which has been sawed off is hollowed out by boring, and the roots of the stump or any other stump which has been hollowed out are removed from the ground.

The apparatus is shown as performing three operations at once but as trees as a rule are not situated in position near each other to permit of this simultaneous operation the three operations are successively carried on by moving the apparatus so as to successively saw a tree close to the ground and then bore the stump and remove all or part of the roots therefrom.

What I claim is:—

In a sawing machine, a feeding device including a framework, a rotary shaft mounted in said framework, a crank shaft extending at right angles thereto, gears on said shafts meshing with each other, saw guides, an oscillating lever arm mounted on the frame, a rod pivotally connected at one end to said arm and at the other end to the crank of the crank shaft, a rotary drum having teeth at its top adjacent said oscillating arm, said teeth being engaged by the arm during one portion of its movement, a saw clamp movable in said guides, and a cord wound upon said drum and connected with the saw clamp.

In testimony whereof I hereunto affix my signature in presence of two witnesses.

JOHN MUZZY.

Witnesses:
JAMES F. FOLEY,
A. M. LIND.